(12) United States Patent
Virolainen

(10) Patent No.: US 8,065,025 B2
(45) Date of Patent: Nov. 22, 2011

(54) CONFIGURATION OF A FREQUENCY CONVERTER

(75) Inventor: Panu Virolainen, Espoo (FI)

(73) Assignee: ABB Oy, Helsinki (FI)

( * ) Notice: Subject to any disclaimer, the term of this patent is extended or adjusted under 35 U.S.C. 154(b) by 1604 days.

(21) Appl. No.: 11/068,047

(22) Filed: Mar. 1, 2005

(65) Prior Publication Data

US 2005/0195537 A1  Sep. 8, 2005

(30) Foreign Application Priority Data

Mar. 4, 2004 (FI) .................................. 20045062

(51) Int. Cl.
*G05B 19/42* (2006.01)

(52) U.S. Cl. ............ 700/86; 235/419; 235/441; 361/18

(58) Field of Classification Search ............. 700/86, 700/245; 235/419, 441; 710/8; 361/18
See application file for complete search history.

(56) References Cited

U.S. PATENT DOCUMENTS

| | | | | |
|---|---|---|---|---|
| 5,630,164 A * | 5/1997 | Williams et al. | ................. | 703/24 |
| 5,909,372 A * | 6/1999 | Thybo | ............................. | 700/83 |
| 6,343,259 B1 * | 1/2002 | Sedlak et al. | ................... | 702/58 |
| 6,553,481 B1 * | 4/2003 | Langton | ......................... | 712/37 |
| 6,855,881 B2 * | 2/2005 | Khoshnood | .................. | 174/15.1 |
| 6,888,948 B2 * | 5/2005 | Hagen et al. | .................. | 381/314 |
| 7,005,888 B1 * | 2/2006 | Baxter | ............................. | 326/41 |
| 7,181,550 B2 * | 2/2007 | Shepard et al. | .................... | 710/8 |
| 7,624,452 B2 * | 11/2009 | Young et al. | ..................... | 726/30 |
| 2001/0019495 A1 * | 9/2001 | Miettinen et al. | ............. | 363/157 |
| 2002/0151993 A1 * | 10/2002 | Olesen et al. | ................... | 700/86 |
| 2004/0001088 A1 * | 1/2004 | Stancil et al. | .................. | 345/748 |
| 2006/0009879 A1 * | 1/2006 | Lynch et al. | ................... | 700/245 |

FOREIGN PATENT DOCUMENTS

EP  1369755  12/2003
WO  03/025878 A2  3/2003

OTHER PUBLICATIONS

ACS 600 MultiDrive. *Engineered frequency converters for speed and torque control of 3 to 4300 kW cage induction motors*, pp. 2-19, ABB AC Drives. EN Jul. 15, 1998.
Variable speed drives, Altivar 31, *High performance instinctively!*, pp. 1-29, Catalogue Telemacanique, Oct. 2003.

* cited by examiner

*Primary Examiner* — Kakali Chaki
*Assistant Examiner* — Sheela S Rao
(74) *Attorney, Agent, or Firm* — Dykema Gossett PLLC

(57) ABSTRACT

A configuration tool for configuring a frequency converter includes an interface with connector poles for connecting the configuration tool to the frequency converter and feeding configuration data from the configuration tool to the frequency converter. To facilitate the configuration of an unelectrified frequency converter, the configuration tool includes a battery or an electromagnetic field generator for conveying the energy required for electrifying at least the memory of the frequency converter to the frequency converter during the configuration.

5 Claims, 2 Drawing Sheets

CONFIGURATION OF A FREQUENCY CONVERTER

FIELD OF THE INVENTION

This invention relates to configuration of an unelectrified frequency converter, where configuration data, such as parameters, application macros or program code, are fed to the frequency converter.

DESCRIPTION OF PRIOR ART

One step when a new frequency converter is put into use is the configuration of the frequency converter. Hereby, the frequency converter is supplied with configuration data which are individualized for the particular object of use and which control the operation of the frequency converter.

A frequency converter is typically configured for use when mounted on the object of use and connected to an electric network. A configuration tool is connected to the frequency converter, which tool may, in practice, be formed of an operating panel or a microcomputer connected to the frequency converter via a cable. Thus, the configuration data can be transferred via the cable to the frequency converter to be stored to the memory of the converter.

One weakness relating to the above solution is that frequency converters have to be delivered as far as to the mounting site without having been configured. This delays the introduction of the converters. In addition, a substitutive frequency converter to be mounted in place of a broken one cannot be configured until it is mounted in place and thus connected to an electric network. This delays the introduction of a substitutive frequency converter.

To eliminate the above drawbacks, such frequency converters have been brought to the market which are configured by providing the frequency converter with an extra memory circuit or memory card in which the configuration data are stored. However, this solution increases the price of the frequency converter unduly, and what is more, attaching the memory requires additional space.

SUMMARY OF THE INVENTION

An object of this invention is to solve the above problem and to provide a solution which allows an unelectrified frequency converter to be configured without a need for additional cost-increasing and space-consuming components to be attached to the frequency converter.

The present invention utilizes a configuration tool which is capable of electrifying at least the memory of the frequency converter. Thus, the configuration can be carried out even before the frequency converter is connected to the electric network at its mounting site. Configuration of such an unelectrified frequency converter can be implemented for instance in a warehouse or on the premises of an equipment manufacturer using the frequency converter as a component, provided that the configuration data of the converter are known. No other auxiliary means are needed for the configuration because the configuration tool can attend to both conveying the required energy to electrify the memory of the frequency converter and to feeding the configuration data to the frequency converter. Further, there is no need to attach additional parts, such as memory, to the frequency converter since the configuration can be accomplished by storing the configuration data in the memory that is already contained in the frequency converter. In this way, cost and space savings are achieved compared with known solutions.

According to the invention, there is thus no need to connect the frequency converter to the electric network via its three-phase input to electrify its memory but it suffices to arrange a low control voltage for the control circuit or only the memory of the frequency converter, this voltage being sufficient for configuration data to be fed to the memory to be stored there. The solution according to the invention thus significantly facilitates the introduction of the frequency converter. The frequency converter can be delivered to the mounting site in a ready-for-use state, owing to which it can be brought into use more quickly and easily than before. Also, the likelihood of errors is reduced, as there is no need for configuration at the mounting stage.

In a preferred embodiment of the invention, a portable configuration tool is utilized which includes a battery for electrifying the memory of the frequency converter. This embodiment is advantageous in the sense that it enables, for instance, configuration of a frequency converter stored in a warehouse without transporting it anywhere else when the converter's final object of use and thus its configuration data are known. In such a case, the portable configuration tool can be easily brought to the frequency converter for the period of configuration.

In a second preferred embodiment of the invention, a wireless interface is utilized between the frequency converter and the configuration tool. In this case, the configuration tool is arranged to generate an electromagnetic field, via which the energy required for electrifying the memory of the frequency converter, can be conveyed to the frequency converter. In addition, the configuration data are transmitted via a wireless connection to the frequency converter. This embodiment is advantageous in the sense that it enables configuration of a frequency converter even when packed in a box, i.e., without having to unpack or even partly open the package. According to the invention, configuration of a packed frequency converter also becomes possible by utilizing a wired interface between the frequency converter and the configuration tool. In such a case, however, the prerequisite is that a door or the like has been arranged on the package, allowing the configuration tool to be connected to the frequency converter.

BRIEF DESCRIPTION OF THE DRAWINGS

The invention will now be described by way of example with reference to the attached drawings, in which.

DESCRIPTION OF THE PREFERRED EMBODIMENTS

Figure 1:
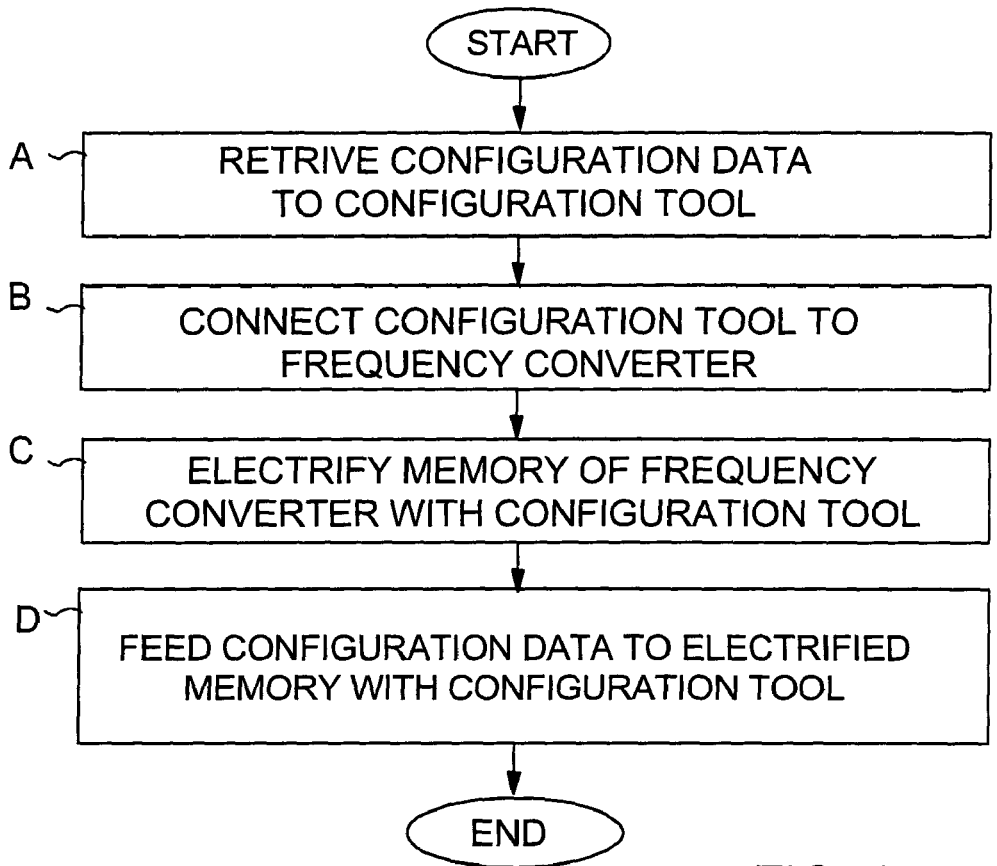
FIG. 1 shows a flow chart of a first preferred embodiment of the method according to the invention.

In block A of FIG. 1, configuration data are retrieved in a configuration tool. If the tool is, for example, a wired configuration tool connected to a computer or telecommunication network via a cable, the configuration data can be retrieved in the configuration tool at the same time as the configuration data are forwarded to a, frequency converter. It is thus not necessary to store the configuration data in the memory of the configuration tool. In this case, the method step shown by block A in FIG. 1 does not have to be implemented until in connection with block D. Thus, it is not necessary to implement the method steps exactly in the order shown by FIG. 1 by way of example.

If, by contrast, a portable configuration tool is involved which is not connected to a computer or telecommunication, network during the configuration, the configuration data can be stored in the memory of the configuration tool in advance. In this case, there is preferably space for configuration data of several frequency converters in the memory, whereby the user of the configuration tool selects, in connection with the configuration, the correct configuration data to be transferred to the frequency converter. The configuration data may be formed of parameters, application macros and program code of the frequency converter or combinations of these, for example.

The configuration data can be retrieved in the configuration tool from a computer to which is has been stored in advance. Alternatively, the configuration data can be fed to the configuration tool manually by means of a keyboard in it.

In block B the configuration tool is connected to the frequency converter. If the interface between the configuration tool and the frequency converter is wired, the connector poles of the configuration tool are brought to contact with the connector poles of the frequency converter. If, by contrast, the interface between the configuration tool and the frequency converter is wireless, it is sufficient that the configuration tool is brought to the vicinity of the frequency converter, in other words to a predetermined distance, which allows a wireless connection to be established between them.

In block C the memory of the frequency converter is electrified with the configuration tool. For this purpose, there may be a switch in the configuration tool, and the user can, by pressing the switch, trigger the conveyance of the energy required for electrifying the memory of the frequency converter from the configuration tool to the frequency converter. If the interface between these two is wired, the electrifying takes place by means of connector poles of the configuration tool and the frequency converter. If, by contrast, the connection is wireless, the configuration tool generates an electromagnetic field, the energy of which can be utilized by the frequency converter in electrifying the memory.

In block D the configuration data are fed from the configuration tool to the electrified memory of the frequency converter. If the interface between them is wired, the configuration data are fed by means of the connector poles of the configuration tool and the frequency converter. If, by contrast, the connection is wireless, the configuration tool sends the configuration data as radio or infrared signals, for instance, to the frequency converter, which stores them in the memory.

When the configuration data have been fed to the memory of the frequency converter, the electrifying of the memory can be stopped; in other words, the configuration tool can be removed from the frequency converter. The configuration tool preferably includes means that indicate (e.g. by sound signal, signal light or text/symbol on the display) to the user when the configuration data have been fed to the frequency converter, whereby the user knows when the configuration tool can be removed from the frequency converter.

Figure 2:
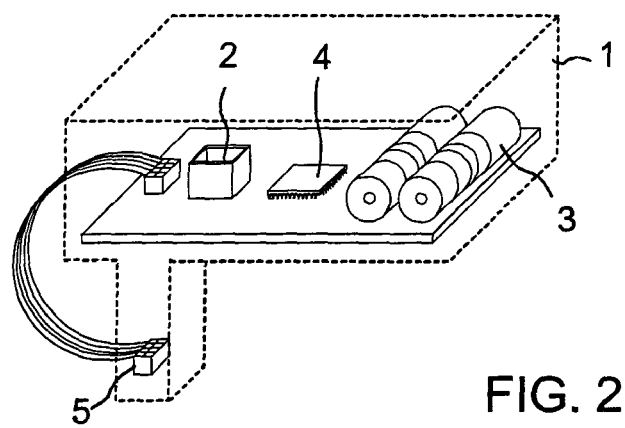
FIG. 2 illustrates a first preferred embodiment of the configuration tool according to the invention.

FIG. 2 illustrates a first embodiment of the configuration tool according to the invention. FIG. 2 shows a principled illustration of the configuration tool 1 by mainly illustrating its components.

Figure 3:
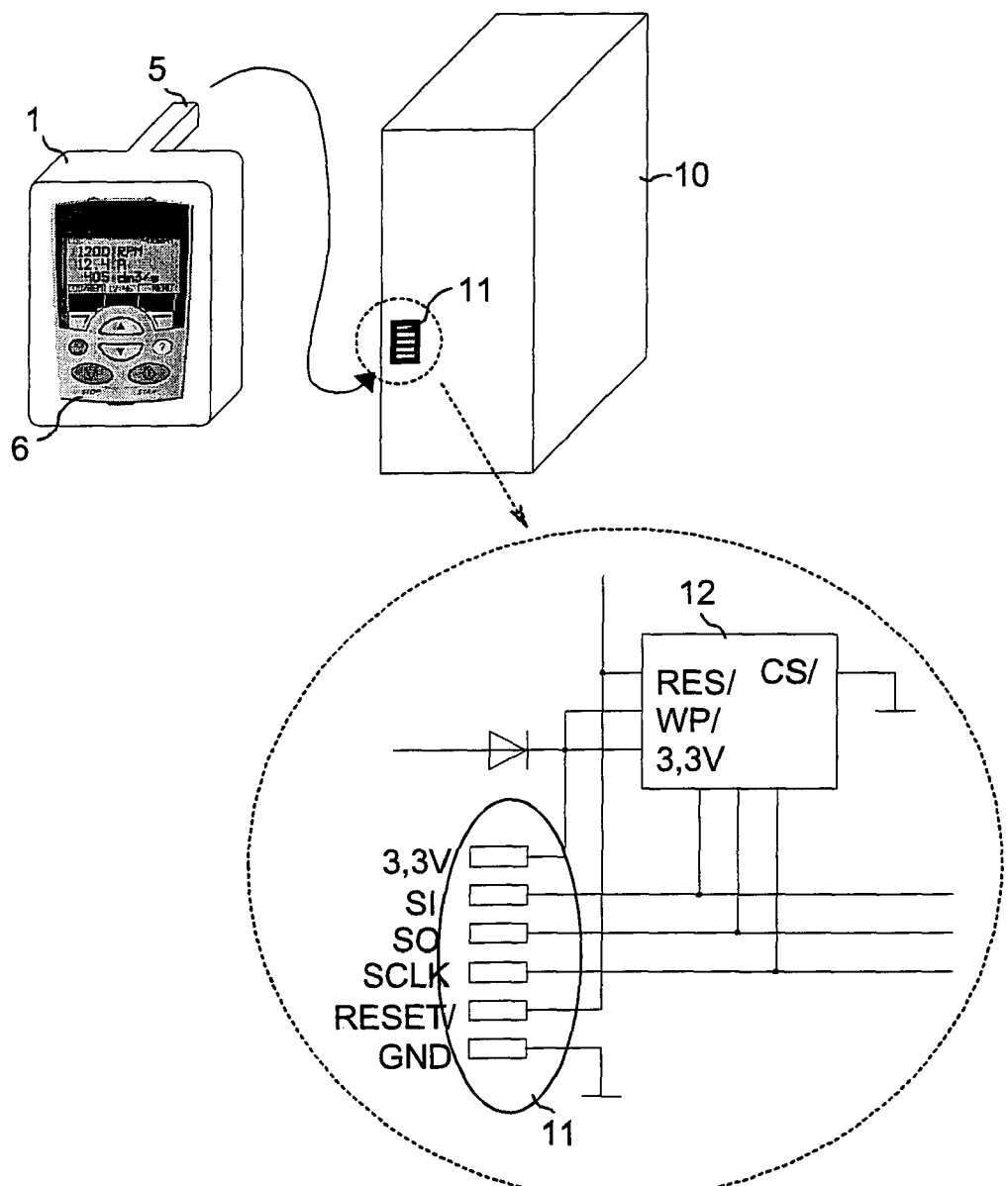
FIG. 3 shows a first preferred embodiment of the configuration tool and the frequency converter according to the invention.

In FIG. 2 the configuration tool is shown without its user interface that is visible in FIG. 3, and in this example formed of a control panel 6 including a keyboard and a display, via which the user can manage and obtain information from the configuration tool. The control panel is connected to the configuration tool via a connector 2 shown in FIG. 2.

The configuration tool 1 of FIG. 2 is a portable configuration tool, the energy required for its operation being taken from a battery 3. The configuration tool comprises an operation-controlling circuit 4 including a memory and a processor. The memory contains a stored program which the process utilizes for controlling the operation of the configuration tool, and also configuration data of the frequency converter or converters can be stored in it, for example by connecting the configuration tool to the computer, from where the configuration data can be retrieved.

The configuration tool 1 comprises a wired interface 5, via which the configuration tool is connected to the frequency converter for the period of configuration. The interface includes connector poles.

Deviating from FIG. 2, the configuration tool may be, during use, connected via a cable to a computer, for example, to which the configuration data are stored. In such a case, neither memory for intermediate storing of configuration data nor a battery for arranging power supply are required in the configuration tool.

FIG. 3 illustrates the use of the configuration tool 1 of FIG. 2 in connection with a frequency converter 10. The circle shown by broken lines in FIG. 3 indicates components included in the frequency converter.

For the period of configuration, the interface 5, i.e., the connector poles, of the configuration tool are brought into contact with an interface 11, i.e., the connector poles, of the frequency converter. The configuration tool may be arranged to indicate to the user when it has been successfully connected to the frequency converter. The configuration tool may be arranged to electrify the frequency converter automatically and to feed the configuration data to it once the configuration tool and the frequency converter have been connected to each other. Alternatively, the configuration tool may be arranged to wait until the user presses a start button on the control panel 6, whereby the configuration tool 1 starts conveying the required energy from its battery 3 to the frequency converter via the interfaces 5 and 11. As a result, a memory 12 of the frequency converter is electrified. The memory 12 may be, for example, a flash memory. Once the memory is electrified, the configuration tool feeds the configuration data stored in its memory via the interfaces 5 and 11 to the frequency converter, where it is stored to the memory 12. When the configuration data have been fed, a notification appears on the display of the control panel 6, after which the user can remove the configuration tool 1 from the frequency converter 10.

The configuration data to be fed from the configuration tool to the frequency converter may have been retrieved in advance from, for example, a computer to which the configuration tool is connected. Alternatively, the user can feed the configuration data to the configuration tool by using the keyboard of the configuration tool, either before the configuration or only after the configuration tool has been connected to the frequency converter and the memory of the frequency converter has been electrified. In this case, it becomes also possible for the user to read, by utilizing the display of the configuration tool, configuration data already stored in the memory of the frequency converter and, subsequently, to modify the configuration data in a suitable manner by feeding new configuration data.

FIG. 3 shows, by way of example, that the interfaces 5 and 11 of the configuration tool and the frequency converter include six connector poles. This is naturally only an example. In practice, the number and voltage of poles may vary case-specifically.

Deviating from the examples of the figures, it is also feasible that the connection between the configuration tool and the frequency converter is arranged to be wireless. In this case, the interface of the configuration tool may include appropriate means for generating an electromagnetic field in its surroundings, as well as means for transmitting the configuration data via a wireless connection, such as a radio or infrared connection. Accordingly, the interface of the frequency converter includes means with which the frequency converter is capable of recovering energy from this electromagnetic field and electrifying the memory with the recovered energy, as well as means for receiving the configuration data transmitted via the wireless connection and for storing them in a memory.

It is to be understood that the above explanation and the attached figures are only intended to illustrate the present invention. Different variations and modifications of the invention will be obvious to a person skilled in the art, without deviation from the scope of the invention.

The invention claimed is:

1. A method of configuring an unelectrified frequency converter having a memory and an input for electrifying by connecting the frequency converter to an electric network and an interface with connector poles for connection of a configuration tool, comprising
   connecting a configuration tool to the frequency converter by connecting connector poles of the configuration tool to the connector poles of the interface,
   electrifying at least the memory in the frequency converter with the configuration tool and by means of said connector poles of the configuration tool and the connector poles of the interface for a period of configuration; and
   feeding by means of the connector poles of the configuration tool and the interface configuration data to the memory in the frequency converter electrified with the configuration tool.

2. The method according to claim 1, wherein said configuration data includes at least one of the following: parameters, application macros or program code.

3. A frequency converter comprising
   a memory;
   an input for electrifying by connecting the frequency converter to an electric network,
   an interface for connecting a configuration tool to the frequency converter, whereby said interface is a wired interface including connector poles shaped to be connected to connector poles in the configuration tool for a period of configuration, during which configuration data is received from the configuration tool and stored in said memory, and at least said memory is electrified for said period of configuration by utilizing energy conveyed from the configuration tool via said connector poles; and
   a control circuit arranged to utilize the configuration data stored in said memory to control the operation of the frequency converter in the way indicated by the configuration data.

4. A configuration tool for configuring a frequency converter having an input for electrifying by connecting the frequency converter to an electric network, which configuration tool comprises an interface for connecting the configuration tool to the frequency converter, said interface is a wired interface including connector poles shaped to be connected to connector poles in an interface of the frequency converter for a period of configuration, during which configuration data is fed from the configuration tool to the frequency converter and stored in a memory of the frequency converter, and energy required for electrifying at least the memory of the frequency converter is conveyed from the configuration tool via the connector poles to the interface of the frequency converter during the period of configuration.

5. The configuration tool according to claim 4, wherein said configuration tool is a portable configuration tool including a battery for conveying said energy to the frequency converter.

* * * * *